(No Model.)
A. D. SPEAR.
LIGHTNING ARRESTER.
No. 426,338. Patented Apr. 22, 1890.
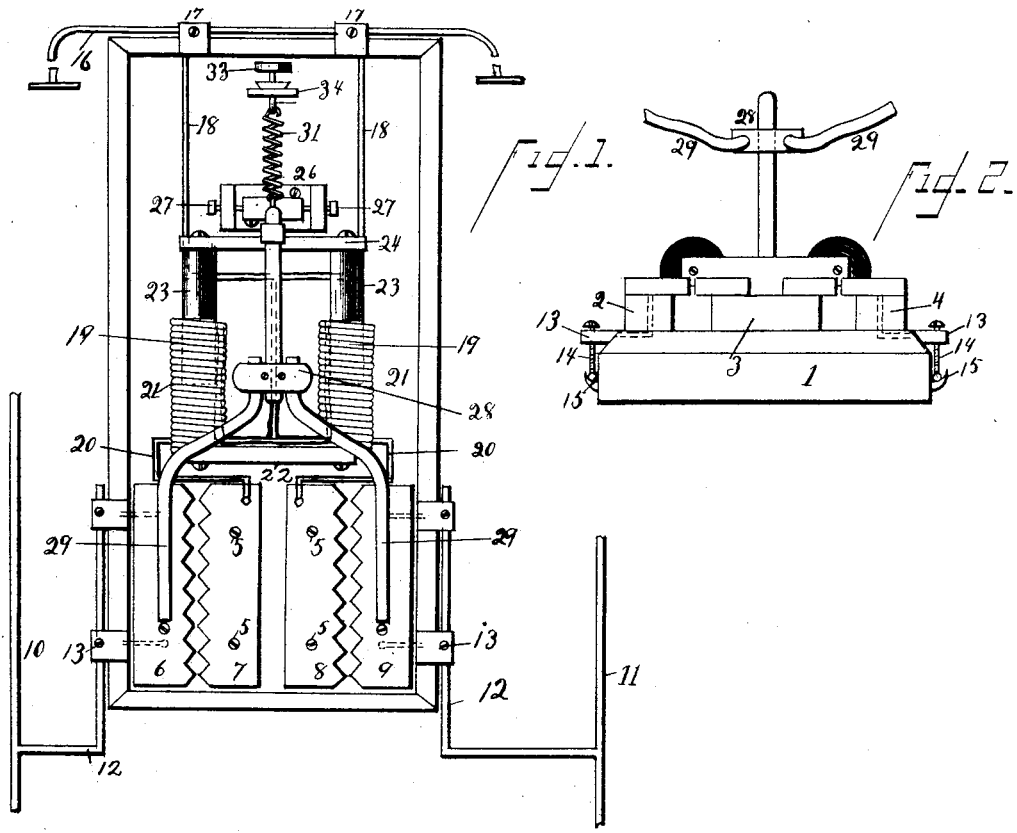
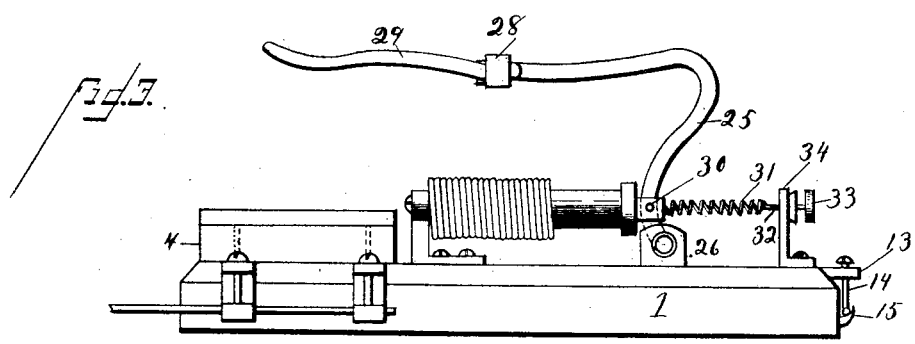
WITNESSES:
INVENTOR:

UNITED STATES PATENT OFFICE.

ARTHUR D. SPEAR, OF GREENVILLE, SOUTH CAROLINA.

LIGHTNING-ARRESTER.

SPECIFICATION forming part of Letters Patent No. 426,338, dated April 22, 1890.

Application filed January 10, 1890. Serial No. 336,490. (No model.)

*To all whom it may concern:*

Be it known that I, ARTHUR D. SPEAR, a citizen of the United States, and a resident of Greenville, in the county of Greenville and State of South Carolina, have invented certain new and useful Improvements in Lightning-Arresters for Electric Light and Power Circuits; and I do hereby declare that the following is a full, clear, and exact description of the invention, which will enable others skilled in the art to which it appertains to make and use the same.

My invention relates to improvements in lightning-arresters for use in connection with electric light and power circuits whereby, should the line be struck by lightning or become overcharged by induction or otherwise with atmospheric electricity, the same will be switched off to ground and all liability of danger to persons or damage to instruments avoided.

It is well known that electric currents generated by a dynamo-machine are not of sufficient power to jump the distance between two separated conductors or plates unless aided in some way, or unless a passage is made for them by some means or other. Natural or atmospheric electricity, however, possesses a very high potential, and is able to jump distances that it would be impossible for a dynamo-current to traverse in its efforts to reach ground.

I have taken advantage of the above facts to construct a lightning-arrester for an electric light or power circuit which will be in operation when the line is in its normal condition—that is to say, when only charged with the currents generated by a dynamo; but when the line is overcharged with induced atmospheric currents or is struck by lightning they will be switched off by conducting-plates to ground, thus obviating any danger from such overcharging. In doing this, however, the dynamo-current is carried off with the atmospheric currents, thus short-circuiting the dynamo-current and rendering it useless. I also provide means for breaking this short circuit, so that the dynamo-current is returned to main line automatically.
The invention consists in the several novel features of construction and new combinations of parts, hereinafter fully described, and then definitely pointed out in the claims.

In the accompanying drawings, Figure 1 is a plan view of a lightning-arresting device constructed according to my invention. Fig. 2 is an end view of the same; and Fig. 3 is a side elevation.

In the said drawings, the reference-numeral 1 designates the base of the instrument, which is rectangular in form, and may be made of any suitable material, such as wood, glass, &c. Mounted upon one end of base 1 are a series of three rectangular blocks 2, 3, and 4. These blocks should be made of wood or other non-conducting material. Secured to these blocks by screws or bolts 5 are the metallic conducting-plates 6, 7, 8, and 9. These plates are arranged in pairs—that is to say, plates 6 and 9 are secured to blocks 2 and 4, while the plates 7 and 8 are secured to block 3. The adjacent edges of the plates of each pair are serrated, as seen in Fig. 1.

The numerals 10 and 11 designate the terminals of a circuit, one positive and the other negative, and a branch 12 from each is connected to plates 6 and 9 by means of clamps 13. These clamps are composed of angular pieces of metal secured to the conducting-plates and in electric connection therewith. They carry at their free ends screw-threaded metal bolts 14, which support the branch wires 12 from the main line by means of the upturned ends 15. The plates 7 and 8 are ground-plates and are connected to ground-wire 16 by clamps 17 17, connecting-wires 18 18, solenoids 19 19, and wires 20 20. The solenoids 19 are composed, as usual, of the insulated coils 21 21, the connecting stationary armature 22, and the movable cores 23 23, connected by cross-piece 24. The cores 23 are capable of freely sliding within the coils 21.

The numeral 25 designates a metallic bent lever or arm. It is pivoted or fulcrumed at its lower enlarged end in the bracket or support 26, secured to base 1 by means of the adjustable bearing-screws 27. This lever extends upwardly a short distance and is then curved and extended horizontally to about the center of the solenoid, where it is provided with a brass clamp 28. To this clamp 28 are secured the copper or other metallic prongs 29 29, which are curved outwardly and then extended horizontally till they lie above the connecting-plates 6 and 8.

Secured centrally to the connecting-piece 24 of the solenoids is a lug 30, which is pivoted to the said lever 25 just above where it is fulcrumed, so that as the cores of the solenoid are moved in or out the prongs 29 are moved down into or out of contact with the plates 6 and 9. Secured to the lug 30 is one end of a coiled spring 31, the outer end being secured to the end of a set-screw 32, having thumb-nut 33, by which the tension of the spring can be regulated. This screw is mounted in the brackets 34, secured to base 1.

The operation of the device is as follows: The drawings show the instrument in its normal position. Should the line be struck by lightning or overcharged with induced currents, the charge will jump from the serrated edges of plate 6 to plate 7 and from plate 9 to plate 8, carrying with it the dynamo-current forming arcs between plates 6, 7, 8, and 9. The charge of lightning passes off to ground from plates 7 and 8 through wires 20 20, solenoids 19 19, wires 18 18, clamps 17 17, and wire 16; but the dynamo-current (very little of which passes to ground unless the line is grounded, which should never be allowed) makes its circuit from the arcs formed through wires 20 20 and solenoids 19 19. Whenever this is done the solenoids become magnetic and the cores 23 23 are drawn into the coils 21 21, pulling the lever 25 down until its extensions or prongs 29 29 touch the plates 6 and 9. The first circuit through the arcs, &c., having a greater resistance than the one just formed through prongs 29 29, piece 28, and plates 6 and 9, the current takes the latter course which short-circuits both pairs of conducting-plates and breaks the arcs of each as the current no longer passes through the solenoids. The cores 23 23 are released and the tension of the spring 31 draws all the parts connected with it back to their normal positions, which, it will be obvious, separates the prongs 29 29 from contact with plates 6 and 9, thus breaking the second short circuit and compelling the dynamo-current to take its proper course.

Having thus described my invention, what I claim is—

1. The combination, with the conducting-plates 6 and 9, connected with a line-circuit, the conducting-plates 7 and 8 adjacent thereto, the connecting-wires 20 20, solenoids 19 19, connecting-wires 18 18, and ground-wire 16, of the pivoted lever 25, actuated by the cores of the solenoids and having the prongs 29 29, which make contact with the plates 6 and 9, when actuated by the solenoids, substantially as described.

2. The combination, with plates 6 and 9, connected with a line-circuit, the plates 7 and 8 adjacent thereto, the connecting-wires 20 20, solenoids 19, connecting-wires 18 18, and ground-wire 16, of the lever 25, pivoted or fulcrumed in a bracket on the base 1, and having prongs 29 29, adapted to make electrical contact with plates 6 and 9, and means, substantially as described, connected with said lever, whereby it is caused to resume its normal position, as and for the purpose set forth.

3. The combination, with the conducting-plates 6 and 9, connected with a line-circuit, the plates 7 and 8 adjacent thereto, the solenoids 19 19, consisting of coils 21 21, united by stationary armature 22, the cores 23 23, sliding in said coils and connected by cross-piece 24, the wires 20 20, connecting the solenoids and plates 7 8, and the wires 18 18 and 16, connecting the solenoids to ground, of the pivoted lever 25, having the prongs or extremities 29 29, and connected with the cores 23 23, so as to move therewith, and the spring 31, connected with the lever and provided with thumb-nut 33, substantially as described.

4. The combination, with plates 6 and 9, connected with a line-circuit, plates 7 and 8 adjacent thereto, stationary armature 22, coils 21 21, cores 23 23, cross-piece 24, connecting-wires 20 20 18 18, and ground-wire 16, of the arm 25, having prongs 29 29, its lower end being pivoted in brackets 26, by means of the adjustable set-screws 27, the lug 30, secured to cross-piece 24 and pivoted to lever 25, the coiled spring 31, set-screw 32, and thumb-nut 33, substantially as described.

In testimony that I claim the foregoing as my own I have hereunto affixed my signature in presence of two witnesses.

ARTHUR D. SPEAR.

Witnesses:
J. A. McDANIEL,
L. M. McBEE.